United States Patent [19]

Ishiguro et al.

[11] Patent Number: 4,831,547
[45] Date of Patent: May 16, 1989

[54] MULTI-JOINT-ROBOT CONTROLLER FOR ENABLING DETECTION OF THE SPATIAL RELATIONSHIP BETWEEN A ROBOT AND A ROTARY CABLE

[75] Inventors: Yasuo Ishiguro; Yoshizumi Itou, both of Toyota; Osamu Shiroshita, Aich, all of Japan

[73] Assignees: Toyota Jidosha Kabushiki Kaisha; Kabushiki Kaisha Toyota Chuo Kenkyusho, both of Aichi, Japan

[21] Appl. No.: 188,668

[22] Filed: Apr. 29, 1988

Related U.S. Application Data

[63] Continuation of Ser. No. 870,993, Jun. 5, 1986, abandoned.

[30] Foreign Application Priority Data

Jun. 6, 1985 [JP] Japan .................. 60-123940

[51] Int. Cl.$^4$ .................. G06F 15/46; G05B 19/42
[52] U.S. Cl. .................. 364/513; 318/568.19; 364/191; 901/3; 901/6
[58] Field of Search .................. 364/191-193, 364/513, 474.36, 478; 901/3, 4, 6, 15, 46, 47, 9; 318/568; 414/730

[56] References Cited

U.S. PATENT DOCUMENTS

| | | | |
|---|---|---|---|
| 3,986,007 | 10/1976 | Ruoff, Jr. .................. | 364/513 |
| 4,381,608 | 5/1983 | Thormann et al. .................. | 33/1 M |
| 4,402,053 | 8/1983 | Kelley et al. .................. | 364/513 |
| 4,456,961 | 6/1984 | Price et al. .................. | 364/513 |
| 4,495,588 | 1/1985 | Nio et al. .................. | 364/513 |
| 4,517,653 | 5/1985 | Tsuchihashi et al. .................. | 364/513 |
| 4,541,062 | 9/1985 | Kada et al. .................. | 364/513 |
| 4,575,802 | 3/1986 | Walsh et al. .................. | 364/513 |
| 4,598,380 | 7/1986 | Holmes et al. .................. | 364/513 |
| 4,602,345 | 7/1986 | Yokoyama .................. | 364/513 |
| 4,613,943 | 9/1986 | Miyaki et al. .................. | 364/513 |
| 4,639,878 | 1/1987 | Day et al. .................. | 364/513 |
| 4,665,493 | 5/1987 | Hattori .................. | 364/474.36 |

FOREIGN PATENT DOCUMENTS

| | | | |
|---|---|---|---|
| 0108549 | 5/1984 | European Pat. Off. .................. | 364/513 |
| 2060204A | 4/1981 | United Kingdom .................. | 364/513 |

Primary Examiner—Joseph Ruggiero
Attorney, Agent, or Firm—Oliff & Berridge

[57] ABSTRACT

Synchronous operation of a multi-joint robot and a rotating table is facilitated by the provision of a multi-joint robot controller. The robot controller detects the position of an arm of the multi-joint robot relative to a coordinate system assigned to the multijoint robot and the position of a specific point on the rotating table relative to the same coordinate system. The spatial relationship of the table relative to the multi-joint robot is calculated based on the coordinates of a plurality of positions of the specific point on the rotating table.

6 Claims, 5 Drawing Sheets

MULTI-JOINT-ROBOT CONTROLLER FOR ENABLING DETECTION OF THE SPATIAL RELATIONSHIP BETWEEN A ROBOT AND A ROTARY CABLE

This is a continuation of application Ser. No. 870,993, filed June 5, 1986, abandoned.

FIELD OF THE INVENTION

This invention relates to a multi-joint robot controller of a system for operating both a robot and a rotary table in cooperation, wherein the controller enables detecting a mutual spatial relationship between the robot and the table.

PRIOR ART

Efforts have been made to automatize and unmannize much complicated tasks by using a robot and a rotary table. In such a robot system including robot and a rotary table, the recognition of the mutual spatial relationship between them, which may be represented by positions and attitudes of the constituents, is indispensable. The recognition of the exact relationship is the basis of a complete task by the system.

For such purposes, so far, the mutual spatial relationship has been measured by a ruler and a clinometer after the robot and the table have been set in position. Or they have been set in position making use of a specific positioning jig.

SUMMARY OF THE INVENTION

Those methods as used before are impossible to recognize the precise spatial relationship between the robot and the rotary table within a tolerance of millimeters and it required much time for correcting the errors from the exact positioning.

When the relationship is known precisely, every operation of the multi-joint robot can be described by the robot assigned coordinates. If there are some errors in the relationship, an operator has to make a so-called teaching, i.e. teaching the robot of its task, at every operating point, which not only lowers efficiency but also may deteriorate the quality of products.

The present invention is achieved to solve the above problems and a purpose of the invention is to detect the mutual spatial relationship between a multi-joint robot and a rotary table with high accuracy and without much efforts.

For that purpose, a multi-joint robot controller (RC) for performing predetermined tasks by operating, in cooperation, a multi-joint-robot (R) and a rotary table (T) has been invented, which comprises:

position detection means (C1) for detecting a position of an arm (RA) of the multi-joint robot (R) as coordinates of a coordinate system (O-XYZ) assigned to the multi-joint robot (R);

specific point detection means (C2) for detecting coordinates of a specific point (TA) on the rotary table (T), by the robot assigned coordinate system (O-XYZ), making use of the position detection means (C1), at any rotating angle of the rotary table (T); and table attitude calculation means (C3) for calculating an attitude of the rotary table (T) on the basis of the robot assigned coordinate system (O-XYZ) from coordinates of a plurality of positions of the specific point (TA) making use of the specific point detection means (C2).

The position detection means (C1) is for detecting the position of the arm (RA) of the robot (R) in a robot assigned coordinates system (O-XYZ). Such a function is usually preinstalled in the robot operating system and it may be used as the position detection means (C1). An example is a mechanism that detects rotation angles of links of a robot (R) around the joint axes (a through f) and transforms them into the robot assigned coordinates. Another example is a mechanism that calculates the position coordinates from driving signals outputted to every servo systems of the robot (R). Either or others will do.

The specific point detection means (C2) detects the position of a specific point (TA) on the rotary table (T) in the robot assigned coordinate system (O-XYZ). And in the detection, no other apparatus is necessary by using the position detection means (C1); simply bringing the arm (RA) on the point (TA) enables the detection. After one time of the detecting is performed, the table (T) is rotated, and hence the point (TA) moves, and the position of the point (TA) is detected again. In such a way several times of the detecting is performed.

Using the detection results of the specific point (TA) at some positions of rotating angles of the rotary table (T), the table attitude calculation means (C3) calculates the attitude of the rotary table (T) in the robot assigned coordinate system (O-XYZ). Here the attitude of a rotary table (T) means the relative spatial position of the entire rotary table (T) against the multi-joint robot (R): e.g. where the rotating center of the rotary table (T) is in the coordinate system (O-XYZ), how much degree the table surface is inclined, etc.

DETAILED DESCRIPTION OF A PREFERRED EMBODIMENT

Figure 1:
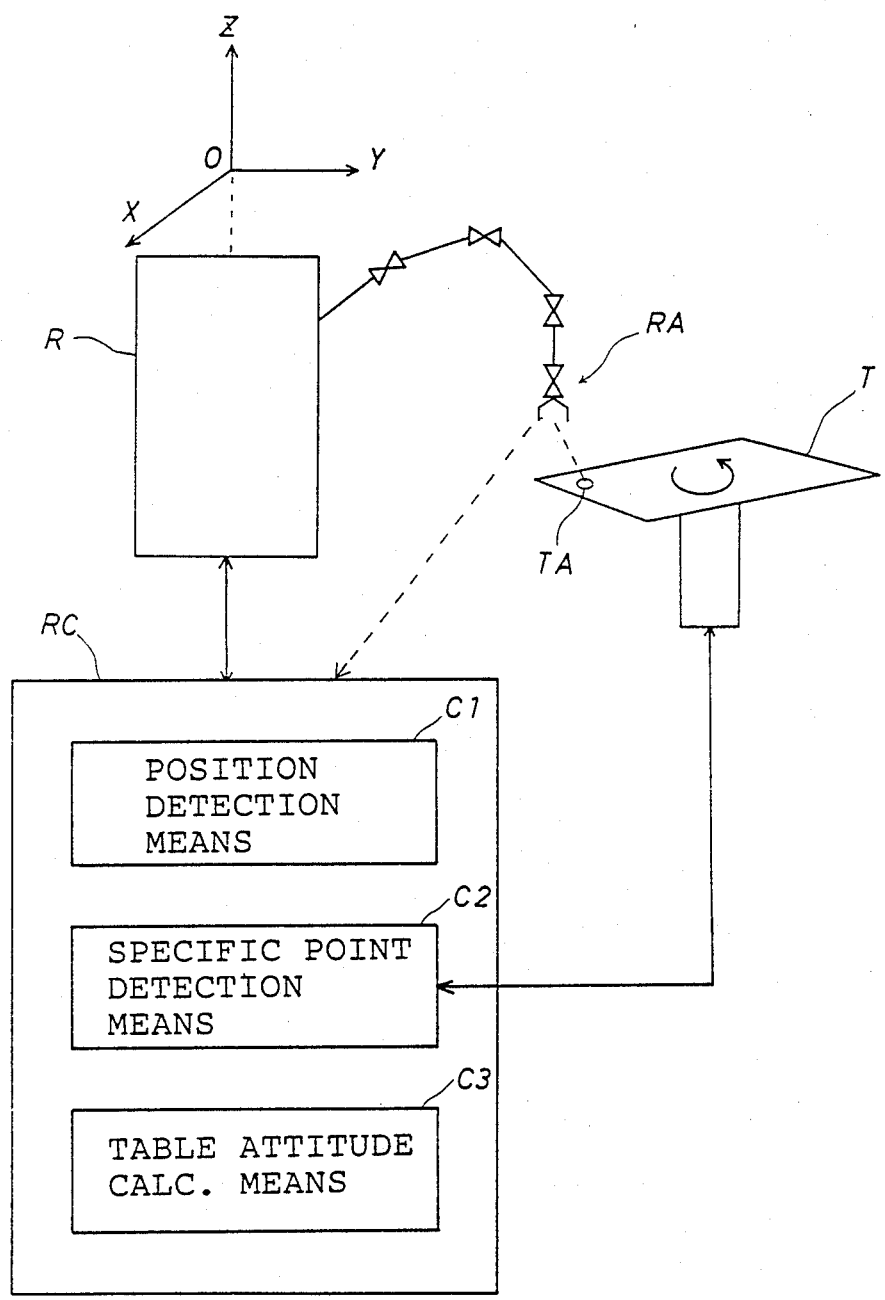
FIG. 1 is a schematic figure for explaining a basic notion of an embodiment of the present invention.
Figure 2:
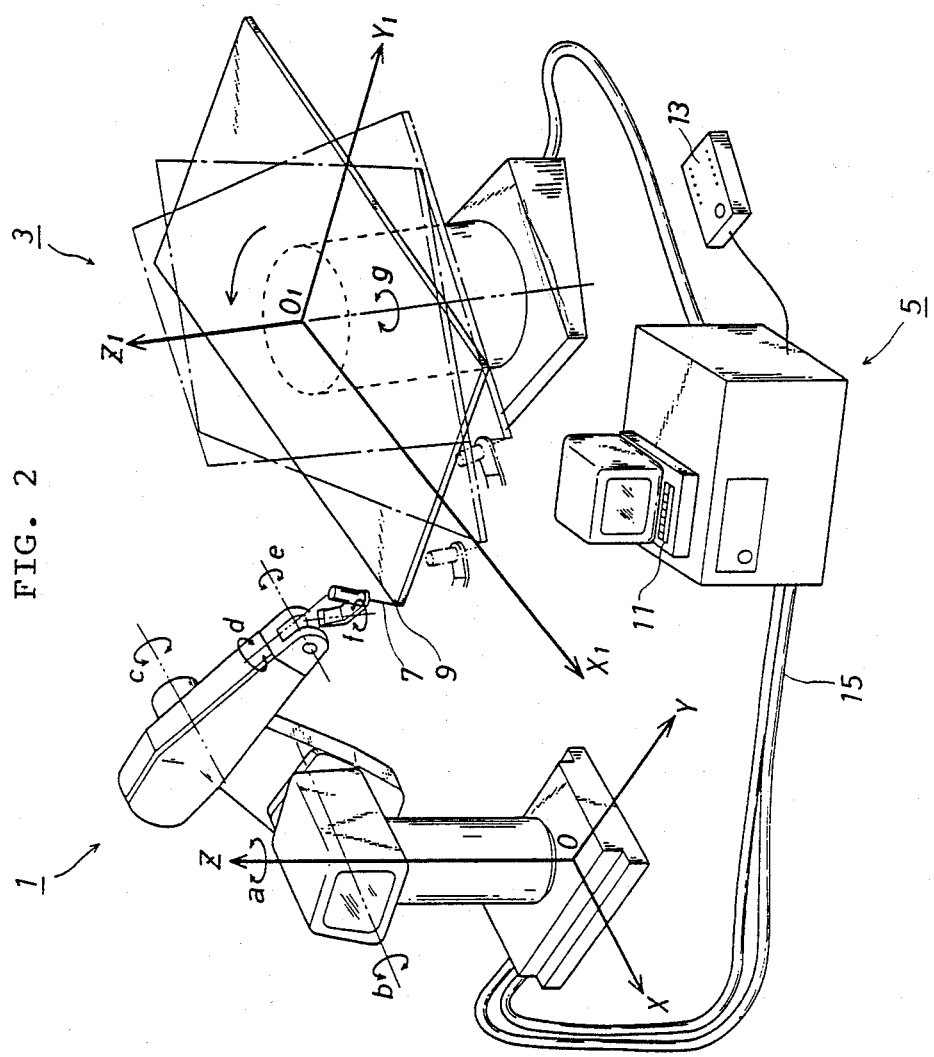
FIG. 2 is a perspective view of an embodiment of the invention including a 6-joint robot (1) and a rotary table (3).

FIG. 2 is a perspective view of a robot system including a 6-joint robot 1, a rotary table 3 and a multi-joint robot controller. The 6-joint robot 1 performs tasks in cooperation with the rotary table 3 responsive to commands of the multi-joint robot controller 5. As shown in FIG. 2, the robot has 6 axes of rotation, a through f, at every joint, enabling a mark detector 7 attached to an arm of the robot 1 to access any point in the three-dimensional space. The mark detector 7 is for detecting precisely the position of a mark 9 attached on the surface of the rotary table 3 and is used for the arm of the robot 1 to access the mark 9. The mark detector 7 may be, for example, a convex tip which adapts with a concave dip on the table 3, a photoelectric converter responsive to a mark 9 of a reflecting platelet on the table surface, etc. The rotary table 3 is driven to rotate around the axis of rotation g.

The multi-joint robot controller 5 controls the robot 1 and the table 3 to rotate around the axes a through f and around the axis g, respectively, enabling the mark detector 7 to move freely in the three dimensional space and enabling the table 3 to rotate freely in its surface plane. For teaching the driving angle of rotation around the axes, the robot controller 5 is equipped with an input device 11, which is composed of a keyboard and a CRT (Cathode Ray Tube), and a teaching box 13. A cable 15 which transmits signals from the robot controller 5 is also shown in FIG. 2.

Figure 3:
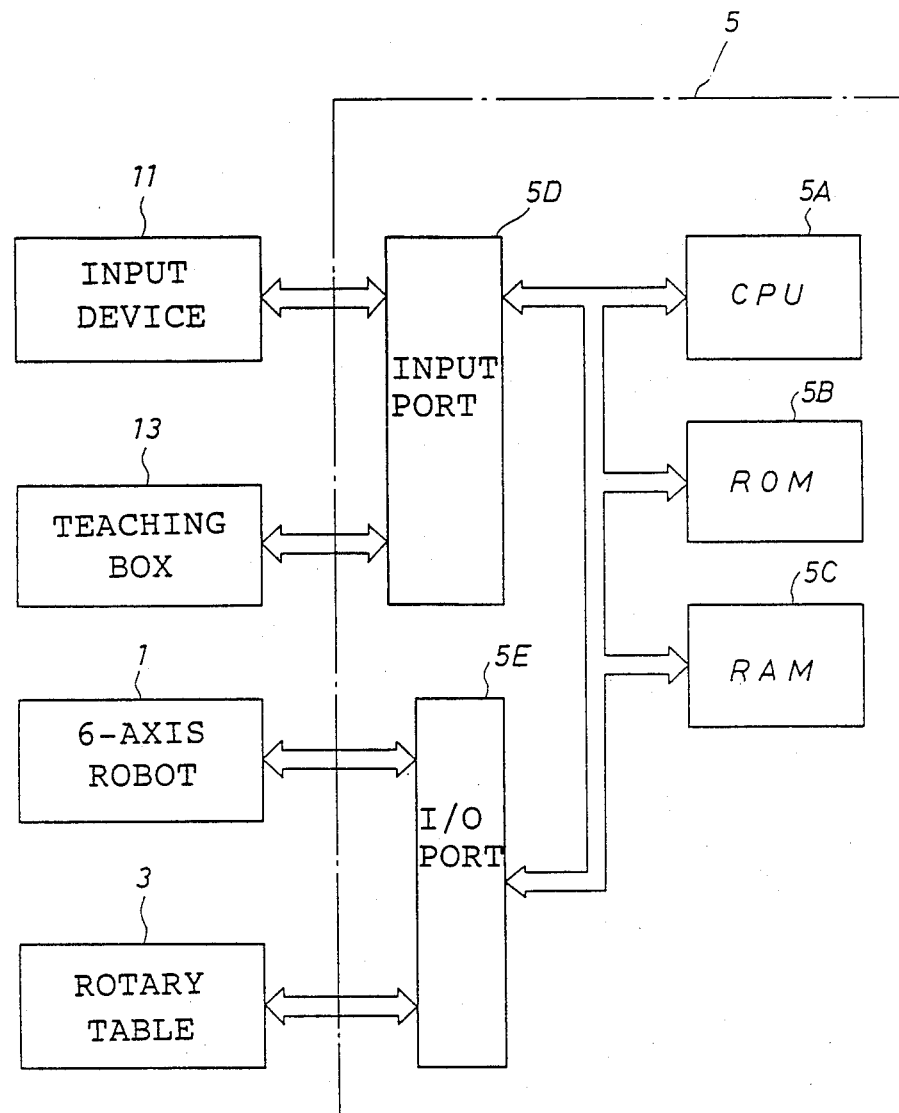
FIG. 3 is a block diagram of control units of the embodiment including an electronic control unit (ECU) (5).

FIG. 3 is a block diagram showing an abstract constitution of the robot controller 5. As shown in the figure, the controller 5 normally has a microcomputer, which includes a CPU (Central Processing Unit) 5A that executes logical calculations according to programs which will be explained later, a ROM (Read Only Memory) 5B in which the programs and various constants are stored, a RAM (Random Access Memory) 5C that stores some tentative variables, an input port 5D that receives data from the input device 11 and the teaching box 13 and an I/O (Input Output) port 5E that exchanges data with the robot 1 and the table 3.

Figure 4:
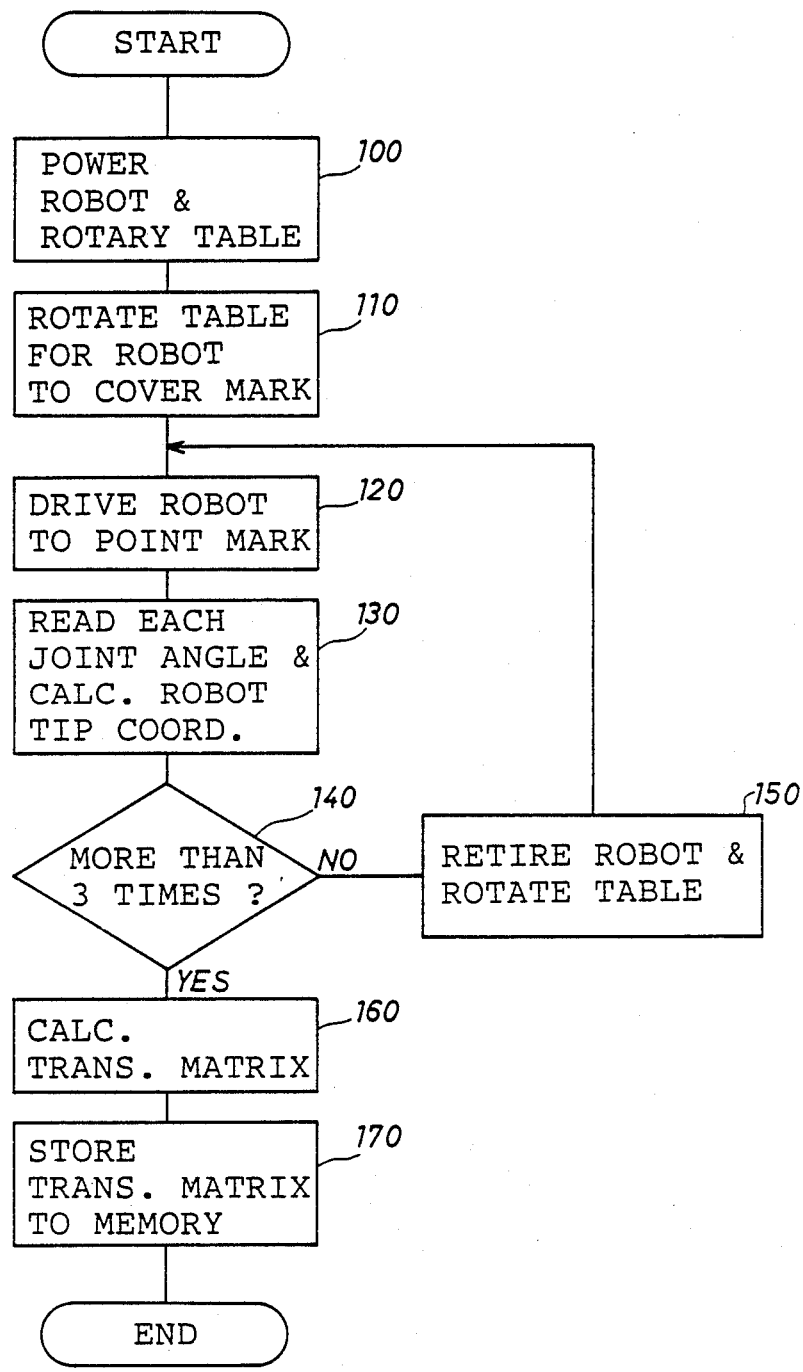
FIG. 4 is a flowchart of processings performed by the ECU (5) in the embodiment.

In the robot system as described above, the robot controller 5 has programs including one shown as a flowchart of FIG. 4 in the ROM 5B which is for calculating the attitude of the table 3 in relation to the robot 1. The CPU 5A automatically starts executing the program as the robot controller 5 is started and, at first in step 100, performs initializations including powering the robot 1 and the table 3, clearing memory space for variables, etc. After the initializations, in step 110, the table 3 is driven to rotate for the mark detector 7 to be able to cover the mark 9 on the table. As shown in FIG. 2, the robot controller 5 has a Cartesian coordinate system (O-XYZ) with the origin (O) at a fixed point of the robot 1. The table 3 is driven so that the mark 9 enters into a space represented by the coordinate system (O-XYZ) which is an accessible space of the mark detector 7. After that, the robot 1 is driven to move the mark detector 7 to detect the mark 9 in step 120, i.e. to match the mark detector 7 to the mark 9 in the three dimensional space. This is done, for example, by driving the arm of the robot to scan on the table surface until the mark detector 7 detects the mark 9, by driving the arm directly with commands by an operator from the teaching box 13, etc. When the mark detector 7 detects the mark 9, the detected result is converted into an output signal in the mark detector 7 and the signal is transmitted through the cable 15 and the I/O port 5E to the CPU 5A. After receiving the detection signal, the CPU 5A performs the next step 130 where the coordinates (x, y, z) of the position of the mark detector 7, i.e. those of the mark 9, are calculated. Every joint, each represented by one of the axes of rotation a through f, of the 6-joint robot 1 is equipped with a rotary angle detector, e.g. a well-known rotary encoder, and a well-used calculation method is used to calculate the coordinates of the position.

After detecting the coordinates (x, y, z) of the mark 9 by the coordinate system (O-XYZ), it is judged in step 140 whether 3 sets of the coordinates (x, y, z) of the mark 9 have been detected. If the result is "NO", the table 3 is rotated with an arbitrary angle of about several tens of degrees in step 150 and the processing goes back to the step 120. With the rotation of the table 3, the mark 9 on the table 3 moves within the space defined by the coordinate system (O-XYZ) with a restriction that the trajectry is within a plane defined by the table surface. The step 120 through step 150 are repeatedly performed in order to get three sets of coordinates of the mark 9 in the plane.

Figure 5:
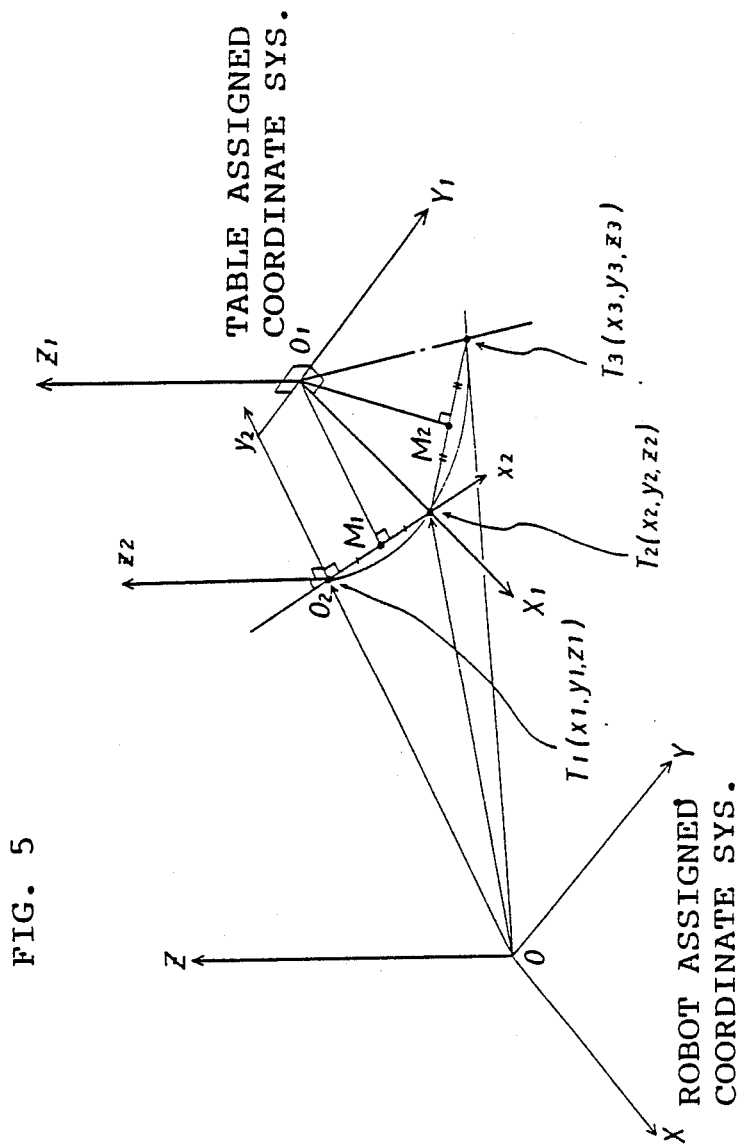
FIG. 5 is a diagram for explaining a relationship between a robot assigned coordinate system (O-XYZ) and a table assigned coordinate system (01-X1Y1Z1).

The tables and mark detectors drawn by chain lines in FIG. 2 show imaginary situations of the mark detection with three different rotation angles of the table 3. FIG. 5 shows the three sets of coordinates, (x1, y1, z1), (x2, y2, z2) and (x3, y3, z3), of the three detection positions, T1, T2 and T3, respectively, represented by the robot assigned coordinate system (O-XYZ). In FIG. 5, a table assigned coordinate system (O1-X1Y1Z1) is also shown, which is defined with the Z1 axis assigned to the axis of rotation of the table 3, the origin 01 assigned to the center of rotation of the table 3 and the X1-Y1 plane assigned to the table surface. So the three points, T1, T2 and T3, exist in the X1-Y1 plane.

After detecting the three sets of coordinates of the three points, T1, T2 and T3, the processing goes to step 160, where a transformation matrix U for a coordinate transformation from the robot assigned coordinate system (O-XYZ) to the table assigned coordinate system (O1-X1Y1Z1) is calculated using the previously aquired data of the three sets of coordinates. Then, in step 170, the transformation matrix U is stored in the RAM 5C and the routine shown by the flowchart of FIG. 4 is finished. The matrix U will be used for performing cooperating operations of the 6-joint robot 1 and the rotary table 3. Those explained so far are actual processings for detecting the position and attitude of the table 3 in relation to the robot 1, and calculating procedures and those physical meanings are then explained.

Each set of coordinates, (x1, y1, z1), (x2, y2, z2) or (x3, y3, z3), represents each position data of the mark detector 7 at T1, T2 or T3, respectively in the robot assigned coordinate system (O-XYZ) and can be calculated by using rotation angles of the 6 axes of rotation of the joints of the robot 1 and sequential transformation matrices, each of which is for transforming between adjacent links of the robot.

For tentative calculations, a coordinate system (O2-X2Y2Z2) is introduced with the origin being at the point T1, the positive X2 axis passing the point T2 and the X2-Y2 plane including the point T3. As apparent from FIG. 5, vectors $\overrightarrow{O2T2}$ and $\overrightarrow{O2T3}$ are given by equations, $$\overrightarrow{O2T2} = \vec{T2} - \vec{T1} \qquad (1)$$

and $$\overrightarrow{O2T3} = \vec{T3} - \vec{T1}. \qquad (2)$$

Then, using those vectors, a tranformation matrix C from the coordinate system (O-XYZ) to the coordinate system (O2-X2Y2Z2) is calculated as $$C = \begin{pmatrix} N & O & A & P \\ 0 & 0 & 0 & 1 \end{pmatrix}, \qquad (3)$$

where A, N and O are column vectors defined as $$A = \frac{\overrightarrow{O2T2} * \overrightarrow{O2T3}}{|\overrightarrow{O2T2} * \overrightarrow{O2T3}|}, \qquad (4)$$

$$N = \frac{\overrightarrow{O2T2}}{|\overrightarrow{O2T2}|} \qquad (5)$$

and $$O = \frac{A * N}{|A * N|} \quad (6)$$

(The symbol * denotes an outer product of the vectors.)

P is a position vector representing the origin of a new coordinate system and is shown as $$P = (x1, y1, z1) \quad (7)$$

From the equations (4) through (7), the transformation matrix C is calculated as an equation (3), in which the matrix C is made to be a 4×4 square matrix including a fourth row (0 0 0 1) for convenience of the following matrix calculations.

Then the coordinates of the points T1, T2 and T3 are transformed to those by the coordinate system (O2-X2Y2Z2) by the following equation.

$$T1' = C^{-1} \times T1 \quad (8)$$

$$= \begin{pmatrix} N & O & A & P \\ 0 & 0 & 0 & 1 \end{pmatrix}^{-1} \times \begin{pmatrix} x1 \\ y1 \\ z1 \\ 1 \end{pmatrix} = \begin{pmatrix} 0 \\ 0 \\ 0 \\ 1 \end{pmatrix}.$$

As the origin O2 of the coordinate system (O2-X2Y2Z2) is at the point T1, the transformation result of the point T1 by the equation (8) is, of course, (0, 0, 0). And similarly T2 and T3 are transformed as, $$T2' = C^{-1} \times T2 = \begin{pmatrix} a1 \\ b1 \\ c1 \\ 1 \end{pmatrix} \quad (9)$$

and $$T3' = C^{-1} \times T3 = \begin{pmatrix} a2 \\ b2 \\ c2 \\ 1 \end{pmatrix}. \quad (10)$$

Nextly, from these transformed coordinates, T1', T2' and T3', the center of rotation O1 on the table surface, denoted as $$O1 = \begin{pmatrix} x0 \\ y0 \\ 0 \\ 1 \end{pmatrix}, \quad (11)$$

is given by the cross section of the two bisectors, M101 and M201, each perpendicular to the line segments, T1T2 and T2T3, respectively, as shown in FIG. 5. So the coordinates of the point O1 are calculated as $$x0 = \frac{b1}{2} \quad (12)$$

and $$(13)$$

$$y0 = -\frac{a2 - a1}{b2 - b1} * x0 + \frac{a2 - a1}{b2 - b1} * \frac{a1 + a2}{2} + \frac{b1 + b2}{2}$$

$$= -\frac{a2 - a1}{b2 - b1} * \left( x0 - \frac{a1 + a2}{2} \right) + \frac{b1 + b2}{2}$$

Then a transformation matrix U for transforming to the table assigned coordinate system (O1-X1Y1Z1), as seen in FIG. 5, constructed by the points $$O1 = \begin{pmatrix} x0 \\ y0 \\ 0 \\ 1 \end{pmatrix},$$

T2 and T3, is calculated as, using equations (1) through (7), $$U = \begin{pmatrix} N' & O' & A' & P' \\ 0 & 0 & 0 & 1 \end{pmatrix}. \quad (14)$$

The matrix U is stored in the memory and is used for transforming coordinate data in course of synchronous operations of the robot system.

The robot 1 is so made to be operated under data based on its own coordinate system (O-XYZ) that the data DT are represented by the coordinate system (O-XYZ). In the sychronous operations with the table 3, therefore, the robot needs to be operated with the data DT transformed by the transformation matrix U from the data represented by the coordinate system (O1-X1Y1Z1) for a point interpolated by the teaching data DR and rotated around the O1Z1 axis. Although there are other methods for synchronizing the operations, it is usually neded that the transformation matrix U is given accurately for recognizing the precise mutual relationship between the robot 1 and the table 3. Using the transformation matrix U, which represents the mutual relationship, the data DR on the coordinate system (O1-X1Y1Z1) is transformed to the data DT on the coordinate system (O-XYZ) as $$DT = U \times DR \quad ... (15).$$

In FIG. 4, a case of a robot and one table is illustrated. Using plural tables, however, it is possible for a robot to operate synchronously with the plural tables by preparing transformation matrices, U1, U2, and so on, each derived from corresponding detection of three points on each table surface, T1, T2 and T3.

As described above, the multi-joint robot controller as an embodiment of the invention recognizes the position and attitude of the rotary table 3 in relation to the 6-joint-robot 1 dexterously utilizing the functions of the robot 1. Since the detection result is stored in the memory as a transformation matrix U, the transformation from the data represented by the table assigned coordinate system (O1-X1Y1Z1) to those represented by the robot assigned coordinate system (O-XYZ) can easily and accurately be performed and it enables affluent tasks performed by the cooperative robot and table system.

In the precedent embodiment, the center of rotation and the inclination of the axis of rotation of the table 3 are altogether derived as the attitude of the rotary table 3. It is possible that only the center of rotation is derived as the attitude.

The transformation is performed by firstly transforming to the coordinate system whose origin is at the point T1 on the table 3 followed by the calculation of the matrix U in the embodiment. However, the calculation method of the matrix U is not limited to the method as described above and other method can be used. For example, the position vector of the origin $\vec{O}$ is calculated first as, using the position vectors, $\overline{T1}$, $\overline{T2}$ and $\overline{T3}$, of the three points on the table, T1, T2 and T3, $$O = \begin{bmatrix} (\vec{T3} - \vec{T2})^t \\ (\vec{T1} - \vec{T2})^t \\ ((\vec{T3} - \vec{T2})*(\vec{T1} - \vec{T2}))^t \end{bmatrix}^{-1} \begin{bmatrix} \left( \frac{\vec{T3} + \vec{T2}}{2}, \vec{T3} - \vec{T2} \right) \\ \left( \frac{\vec{T1} + \vec{T2}}{2}, \vec{T1} - \vec{T2} \right) \\ (\vec{T2}, (\vec{T3} - \vec{T2})*(\vec{T1} - \vec{T2})) \end{bmatrix},$$

where $( )^t$ denotes a transverse matrix and $(a,b)$ denotes an inner product of a and b. Then the transformation matrix U can be calculated from the result and the three position vectors, $\overline{T1}$, $\overline{T2}$ and $\overline{T3}$, as $$U = \begin{bmatrix} \frac{\vec{T2} - \vec{O}}{|\vec{T2} - \vec{O}|} & \frac{(\vec{T3} - \vec{T2})*(\vec{T1} - \vec{T2})}{|(\vec{T3} - \vec{T2})*(\vec{T1} - \vec{T2})|} \cdot \frac{\vec{T2} - \vec{O}}{|\vec{T2} - \vec{O}|} & \frac{(\vec{T3} - \vec{T2})*(\vec{T1} - \vec{T2})}{|(\vec{T3} - \vec{T2})*(\vec{T1} - \vec{T2})|} & O \\ 0 & 0 & 0 & 0 & 1 \end{bmatrix}$$

Thus, any method of calculation of the matrix U is apparent to bring the same function and effect of the robot system control as described above.

What is claimed is:

1. A multi-joint robot controller (RC) for performing predetermined tasks by operating, in cooperation, a multi-joint-robot (R) and a rotary table (T), comprising:

position detection means (C1) for detecting a position of an arm (RA) of the multi-joint robot (R) as coordinates of a robot assigned coordinate system (O-XYZ) assigned to the multijoint robot (R);

specific point detection means (C2) for detecting coordinates of a specific point (TA) on the rotary table (T) in the robot assigned coordinate system (O-XYZ) at three or more different positions occupied by said specific point, said specific point occupying different positions by virtue of rotation of said rotary table, said coordinates being detected by the position detection means (C1); and table attitude calculation means (C3) for calculating a center of rotation and an attitude of rotation of the rotary table (T) in the robot assigned coordinate system (O-XYZ) from said coordinates.

2. The multi-joint robot controller (RC) as claimed in claim 1, wherein the position and attitude of the rotary table (T) calculated by said table attitude calculation means (C3) is stored as a transformation matrix (U) for transforming from a table assigned coordinate system (O1-X1Y1Z1) to the robot assigned coordinate system (O-XYZ).

3. The multi-joint robot controller (RC) as claimed in claim 1, wherein the attitude of the rotary table (T) is represented by a center of rotation and an inclination of the axis of rotation of the rotary table (T).

4. The multi-joint robot controller (RC) as claimed in claim 1, wherein the position detection means (C1) detects the position of the arm of the robot from every rotating angle of the joints of the multi-joint robot.

5. The multi-joint robot controller (RC) as claimed in claim 1, wherein the position detection means (C1) detects the position of the arm of the robot from every driving signal outputted to serve systems of the multi-joint robot.

6. The multi-joint robot controller (RC) as claimed in claim 1, wherein the multi-joint robot controller (RC) operates a multi-joint robot (R) and a plurality of rotary tables (T), in cooperation, and the table attitude calculation means (C3) calculates every attitude of the tables (T).

* * * * *

UNITED STATES PATENT AND TRADEMARK OFFICE
CERTIFICATE OF CORRECTION

PATENT NO. : 4,831,547
DATED : May 16, 1989
INVENTOR(S) : Yasuo Ishiguro; Yoshizumi Itou; Osamu Shiroshita It is certified that error appears in the above-identified patent and that said Letters Patent is hereby corrected as shown below:

IN THE TITLE: Change "CABLE" to --TABLE--.

Signed and Sealed this

Seventeenth Day of October, 1989

Attest:

DONALD J. QUIGG

Attesting Officer

Commissioner of Patents and Trademarks